Aug. 23, 1932.   J. C. EVANS   1,873,324
INTERNAL COMBUSTION ENGINE
Filed Oct. 3, 1927
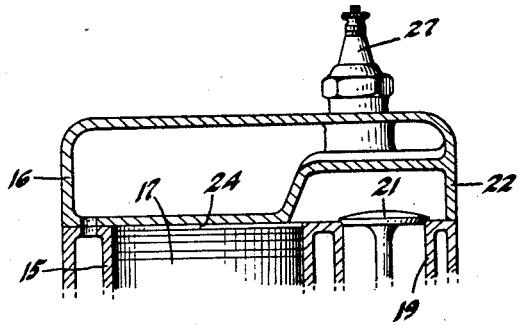
Fig.1
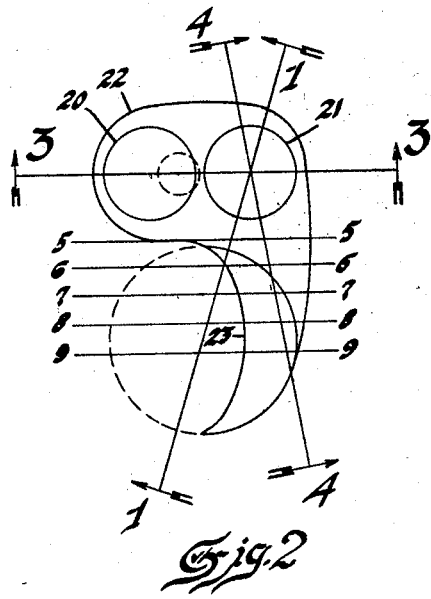
Fig.2
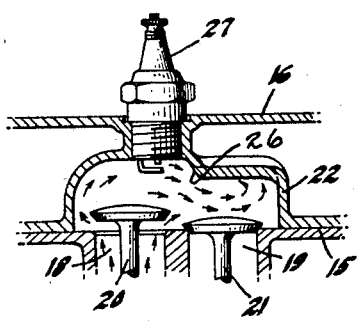
Fig.3
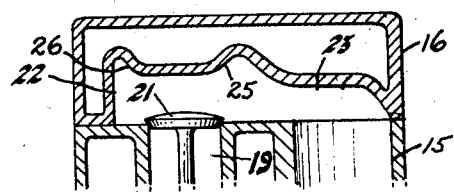
Fig.4
 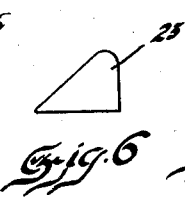  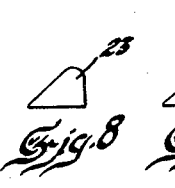 
Fig.5  Fig.6  Fig.7  Fig.8  Fig.9
INVENTOR.
BY James Clock Evans
ATTORNEY.

Patented Aug. 23, 1932

1,873,324

UNITED STATES PATENT OFFICE

JAMES CLARK EVANS, OF DETROIT, MICHIGAN

INTERNAL COMBUSTION ENGINE

Application filed October 3, 1927. Serial No. 223,499.

This invention relates to internal combustion engines and particularly to combustion chambers therefor, the principal object being the provision of a combustion chamber of new and novel design.

Another object is to provide a combustion chamber for internal combustion engines so shaped that the combustible mixture entering the same through the inlet port is directed into contact with the exhaust valve whereby to effect a cooling of the same.

Another object is to provide a combustion chamber for internal combustion engines so shaped that the combustible mixture on the compression stroke is directed over and into contact with the exhaust valve whereby to effect a cooling of the same.

Another object is to provide a combustion chamber for internal combustion engines in which the greater percentage of combustible mixture on the compression stroke is caused to circulate over the exhaust valve thereby tending to cool the same.

Another object is to provide a combustion chamber for internal combustion engines so formed as to direct the exhaust gases on the exhaust stroke into the exhaust port.

Another object is to provide a combustion chamber for internal combustion engines in which the main portion of the same is offset from the cylinder bore and is connected thereto by a tangential passage of gradually decreasing area whereby the combustible mixture entering the cylinder is caused to swirl in the cylinder and on the compression stroke is caused to swirl in the combustion chamber thereby effecting a turbulence of the mixture productive to rapid flame propagation in the mixture.

Another object is to provide a gourd-shaped combustion chamber for internal combustion engines, the greater percentage of the volume of the combustion chamber being offset in relation to the cylinder bore and being joined thereto by a tapering tangential passage, the head of the piston adapted to closely approach the cylinder head at the end of each upward stroke whereby to cause substantially all of the residuary burnt gases in the cylinder to be driven into the combustion chamber and there be intimately mixed with the combustible mixture therein.

A further object is to provide a combustion chamber for internal combustion engines in which a baffle is provided for protecting the spark plug against direct contact with the lubricating oil particles carried in the combustible mixture on the compression and exhaust strokes.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views,—

Fig. 1 is a fragmentary vertical sectional view taken through the head of an internal combustion engine provided with a combustion chamber constructed in accordance with the present invention, taken as on the line 1—1 of Fig. 2.

Fig. 2 is a diagrammatic plan view of the combustion chamber shown in connection with the engine in Fig. 1.

Fig. 3 is a sectional view taken on the line 3—3 of Fig. 2.

Fig. 4 is a section taken on the line 4—4 of Fig. 2.

Figs. 5 to 9 inclusive are diagrammatic sectional views of the combustion chamber taken on the lines 5—5 to 9—9 inclusive of Fig. 2.

It is well known in the art that one of the most prolific causes of trouble in operating internal combustion engines at high speeds is the difficulty of being able to adequately cool the exhaust valve, such valves invariably becoming over-heated with resulting distortion and pitting, which results in the consequent impairment of the proper functioning of the engine. It is one of the objects in the present invention to provide a combustion chamber so designed as to direct the combustible mixture before explosion into contact with the exhaust valve and thereby absorb heat from the same, materially aiding in the cooling of the valve.

It is also well recognized in the art that if turbulence of the combustible mixture is increased and if the residual exhaust gases remaining in the cylinder after closing of the exhaust valves are intimately mixed with the combustible mixture before explosion, a more uniform explosion takes place and the phenomenon of spark knocking is eliminated, and the present invention provides a construction designed to promote turbulence and mixture of the residual exhaust gases with the combustible charge.

In accordance with the present invention I show in the accompanying drawing an engine of the four-cycle type provided with a cylinder 15 and a cylinder head 16, the cylinder being provided with a suitable piston 17. The engine shown is of L-head type, the intake port 18 and exhaust port 19 being offset from the cylinder 15 and being provided with a suitable inlet and exhaust valve 20 and 21 respectively. The combustion chamber 22 is formed in the cylinder head 16 to provide the greatest portion of its volume over the valves 20 and 21 and is connected to the cylinder 15 by a tail-like portion 23.

As indicated in Fig. 2 the main body portion of the combustion chamber is somewhat elliptical in plan view and the tail-like portion 23 which connects it to the cylinder 15 is curved outwardly with respect to the axis of the cylinder and extends from one edge of said main portion in gradually diminishing cross sectional area to the cylinder 15 at a point adjacent the opposite side of the cylinder from the valves where it fades out. The greater portion of the lower face 24 of the cylinder head 16 is flat and in the line of split between the cylinder block and the cylinder head, and is closely approached by the head of the piston 17 at the end of the upward stroke of the piston. The gradually decreasing area of the tail-like portion 23 which connects the main body portion 22 of the combustion chamber with the cylinder 15 is clearly illustrated in Figs. 4 to 10 inclusive, which shows that the greatest depth of the combustion chamber, particularly in the tail-like portion 23, is adjacent the outer edge thereof, thus tending to impart a more forcible rotary movement to the combustible mixture in the combustion chamber on the compression stroke than would otherwise be possible. The combustion chamber in plan view may be aptly described as shaped like a comma, the tail of the comma connecting the body or main portion of the combustion chamber with the cylinder, and the intake valve being positioned at that part of the comma most remote from the tail.

As far as the construction has thus been described, it will be apparent that the combustible mixture drawn through the port 18 and past the valve 20 on the intake stroke of the piston 17 will be directed over the exhaust valve 21 in its passage to the cylinder 15, and that on the compression stroke substantially all of the combustible mixture will be driven back in to the main body portion of the combustion chamber and will, because of its circular formation, be caused to swirl around in the same over and in contact with the exhaust valve 21. The repeated contact of the relatively cool combustible mixture thus coming in contact with the exhaust valve 21 will tend to absorb heat from the same and cool it, thus materially aiding in preventing the temperature of the exhaust valve 21 from reaching a temperature dangerous to its life and proper functioning.

In order to further induce contact of combustible mixture with the exhaust valve 19, I prefer to form a pair of baffles 25 and 26 on the interior of the combustion chamber and so situated as to direct the combustible mixture entering the combustion chamber through the port 18 downwardly into contact with the exhaust valve 21, and to direct the combustible mixture being forced back into the combustion chamber on the compression stroke of the piston 17 downwardly into contact with the exhaust valve 21, the baffle 25 being so situated also provides an additional desirable feature in that it also serves to direct the exhaust gas into the exhaust port 19 on the exhaust stroke of the piston 17 when the exhaust valve 21 is lifted from its seat. The baffle 26 also provides an additional desirable feature in that the spark plug 27 which is preferably positioned behind the same is protected from oil particles carried by the combustible mixture or the exhaust gases and which would otherwise impinge upon the same thereby tending to build up carbon deposits in the spark plug and otherwise foul it.

Inasmuch as the portion 23 which connects the main body portion of the combustion chamber 22 with the cylinder 15, connects the cylinder 15 at a tangent to the surface thereof and at a gradual angle to a plane perpendicular to its axis, it will be apparent that the combustible mixture entering the cylinder will be caused to swirl around in the same and intimately mix the different portions of the mixture with any residual exhaust gases that may be remaining in the cylinder at that time.

Furthermore as the head of the piston 17 approaches to almost contacting relationship with the cylinder head 16 over the greater portion of the head of the piston 17, it will be apparent that no dead pockets are provided which might collect exhaust gases and hinder the subsequent mixture of the same with the combustible mixture. Because of these things the combustible mixture, before explosion, has become a homogeneous mixture particularly favorable to rapid flame propagation and absence from detonating effects.

Formal changes may be made in the specific embodiment of the invention described without departing from the spirit or substance of the broad invention, the scope of which is commensurate with the appended claims.

What I claim is:

1. In an internal combustion engine, a cylinder, a piston reciprocable therein, a combustion chamber, intake and exhaust valves opening into said chamber, and baffling means formed on a wall of said chamber for directing substantially all of the combustible mixture entering said combustion chamber on the suction stroke of said piston downwardly into contact with said exhaust valve both on said suction stroke and on the compression stroke of said piston.

2. In an internal combustion engine, a cylinder, a piston reciprocable therein, a combustion chamber the main portion of which is off-set from the cylinder and connected thereto by a restricted passage, intake and exhaust ports opening into said chamber, and baffling means formed on the roof of said chamber for directing the exhaust gases downwardly into said exhaust port on the exhaust stroke of said piston and protecting the spark plug of the engine.

3. In an internal combustion engine of the L-head type, a combustion chamber, an exhaust valve and an intake valve opening into said chamber, and baffling means integral with a wall of said chamber for directing combustible mixture entering said chamber past said intake valve downwardly into contact with said exhaust valve.

4. In an internal combustion engine, a cylinder, a piston reciprocable therein, a combustion chamber off-set from said cylinder and connected therewith by a restricted passage, said combustion chamber serving as substantially the entire combustion volume when said piston is at the point of greatest compression, an intake and an exhaust valve in said chamber, and means formed on the top surface of said combustion chamber for directing the combustible mixture downwardly on the compression stroke into contact with said exhaust valve and protecting the spark plug of the engine.

5. In an internal combustion engine, a cylinder, a combustion chamber comprising a main portion and a lesser portion, said main portion being approximately elliptical in plan view and lying wholly to one side of said cylinder, an intake and an exhaust port opening into said combustion chamber, and said lesser portion being of less average width than the radius of said cylinder and connecting a side of said main portion with a side of said cylinder said lesser portion being of triangular formation in transverse section.

6. In an internal combustion engine, a cylinder, a piston reciprocable therein, and a combustion chamber comprising a main portion and a lesser portion, said main portion being approximately elliptical in plan view and lying wholly to one side of the bore of said cylinder, an intake and an exhaust port opening into said main portion, and said lesser portion connecting said main portion at a point adjacent said exhaust port and relatively remote from said intake port with a side of said cylinder, said lesser portion being of less average width than the radius of said cylinder and being of triangular formation in transverse section, the apex of said triangle being positioned radially outwardly of the center of said cylinder from the center line of said lesser portion.

7. In an internal combustion engine, a cylinder, a piston reciprocable therein, a combustion chamber, said combustion chamber comprising a main portion of approximately elliptical shape lying wholly outside the bore of said cylinder and a lesser portion connecting said main portion with said cylinder, said lesser portion being of less average width than the radius of said cylinder and curving outwardly of a line tangent to both said main portion and said cylinder and gradually decreasing in cross-sectional area from said main portion to said cylinder, the greatest depth of said lesser portion lying outwardly of its vertical center-line.

8. In an internal combustion engine, in combination, a cylinder, a combustion chamber comprising a main portion and a single lesser portion disposed substantially entirely on one side of the axis of said cylinder, said main portion being substantially elliptical in plan view and lying substantially outwardly of the walls of said cylinder, said lesser portion connecting said main portion with said cylinder, and valves opening into said main portion, said lesser portion being of less average width than the radius of said cylinder, and extending from one end of said main portion to the opposite side of said cylinder from said valves, the outer line of said lesser portion in plan view representing a point travelling on a part of an elliptical path.

9. In an internal combustion engine, in combination, a cylinder, a combustion chamber comprising a main portion and a single lesser portion disposed substantially entirely on one side of the axis of said cylinder, said main portion lying substantially outwardly of the walls of said cylinder and being approximately elliptical in plan view, said lesser portion connecting said main portion with said cylinder, and valves opening into said main portion, said lesser portion being of less average width than the radius of said cylinder and extending from one end of said main portion to the opposite side of said cylinder from said valves, the outer line of said lesser portion in plan view representing a point travelling on a part of an elliptical path, and being tangent at its ends to the outer surface of said main portion and to said cylinder.

10. In an internal combustion engine, in combination, a cylinder, a combustion chamber comprising a main portion and a lesser portion, said main portion lying substantially wholly outwardly of the walls of said cylinder, said lesser portion connecting said main portion with said cylinder, and an intake and an exhaust valve opening into said main portion, said lesser portion being of less average width than the radius of said cylinder and extending from said main portion to the opposite side of said cylinder and being curved outwardly and being disposed wholly outwardly of the axis of said cylinder in plan view, said lesser portion being triangular in cross section with that side of said triangle most remote from the axis of said cylinder positioned in substantially parallel relationship with respect to the axis of said cylinder.

11. In an engine of the character described, a cylinder, a piston, a cylinder head having a primary valve controlled combustion chamber to one side of the cylinder and having a secondary combustion chamber communicating with the primary chamber sloping downwardly therefrom above the piston face and curving about the axis of the piston, said cylinder head provided with a wall having a minimum clearance above the remainder of the piston face when the piston is at the upper limit of its stroke.

12. In an engine of the character described, a cylinder, a piston, a cylinder head having a valve combustion chamber formed therein to one side of the cylinder and also having a secondary combustion chamber formed therein communicating with the valve combustion chamber, the volume of said secondary chamber being materially smaller than the volume of the valve combustion chamber, said secondary chamber extending beyond a plane passing through adjacent piston axes and to one side of the associated piston axis, said cylinder head having a portion thereof providing minimum clearance above the remainder of the piston face when the piston is in the outer limit of its travel.

13. In an engine of the character described, a cylinder, a piston, a cylinder head having a valve combustion chamber formed therein to one side of the cylinder and also having a secondary combustion chamber formed therein communicating with the valve combustion chamber, the volume of said secondary chamber being materially smaller than the volume of the valve combustion chamber, said secondary chamber extending beyond a plane passing through adjacent piston axes and to one side of the associated piston axis, said cylinder head having a portion providing minimum clearance above the remainder of the piston face when the piston is in the outer limit of its travel, the portion of the piston face covered by the secondary chamber being less than the said minimum clearance portion thereof.

14. In an engine of the character described, a cylinder, a piston, a cylinder head having a primary valve controlled combustion chamber to one side of the cylinder and also having a secondary combustion chamber above a portion of the cylinder communicating with the primary chamber, said secondary chamber curving substantially crescent-shaped about the axis of the piston and extending at least to the engine longitudinal plane containing the piston axis but terminating short of that portion of the transverse plane of the engine containing the piston axis extending on the opposite side from the primary chamber of the longitudinal plane of the engine containing the piston axis, said cylinder head provided with a wall having a minimum clearance over the remainder of the piston face when the piston is at the upper limit of its stroke.

15. In an engine of the character described, a cylinder, a piston, a cylinder head having a primary valve controlled combustion chamber to one side of the cylinder and also having a secondary combustion chamber communicating with the primary chamber sloping downwardly therefrom above the piston face and curving about the axis of the piston, said cylinder head provided with a wall having a minimum clearance above the remainder of the piston face when the piston is at the upper limit of its stroke, intake and exhaust valves for said primary chamber arranged to provide cooling of the exhaust valve by the intake gases passing from the primary chamber to the cylinder.

16. In an engine of the character described, a cylinder, a piston, a cylinder head having a primary valve controlled combustion chamber to one side of the cylinder and also having a secondary combustion chamber above a portion of the cylinder communicating with the primary chamber, said secondary chamber curving about the axis of the piston and terminating short of the engine transverse plane through the piston axis, said cylinder head provided with a wall having a minimum clearance over the remainder of the piston face when the piston is at the upper limit of its stroke, and intake and exhaust valves for said primary chamber arranged to provide cooling of the exhaust valve by the intake gases passing from the primary chamber to the cylinder.

17. In an engine of the character described, a cylinder, a piston, a cylinder head having a primary valve controlled combustion chamber to one side of the cylinder and also having a secondary combustion chamber above a portion of the cylinder communicating with the primary chamber, said secondary chamber curving substantially crescent shaped about the axis of the piston and extending at least to the engine longitudinal plane containing the piston axis but terminating short of the engine transverse plane containing the piston axis, said cylinder head provided with a wall having a minimum clearance over the remainder of the piston face when the piston is at the upper limit of its stroke, and intake and exhaust valves for said primary chamber arranged to provide cooling of the exhaust valve by the intake gases passing from the primary chamber to the cylinder.

JAMES CLARK EVANS.